(12) United States Patent
Lee et al.

(10) Patent No.: US 10,014,783 B2
(45) Date of Patent: Jul. 3, 2018

(54) SWITCHING REGULATOR WITH PFC FUNCTION AND CONTROL CIRCUIT AND CONTROL METHOD THEREOF

(71) Applicant: RICHTEK TECHNOLOGY CORPORATION, Zhubei, HsinChu (TW)

(72) Inventors: Yi-Wei Lee, Taipei (TW); Chien-Yang Chen, Taipei (TW); Isaac Y. Chen, Zhubei (TW); Ta-Yung Yang, Taoyuan (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/395,641

(22) Filed: Dec. 30, 2016

(65) Prior Publication Data
US 2017/0331381 A1 Nov. 16, 2017

Related U.S. Application Data

(60) Provisional application No. 62/336,308, filed on May 13, 2016.

(51) Int. Cl.
*H02M 3/335* (2006.01)
*H02M 1/42* (2007.01)
*H02M 1/00* (2006.01)
*H02M 3/156* (2006.01)
*H02M 1/088* (2006.01)

(52) U.S. Cl.
CPC ....... *H02M 3/33507* (2013.01); *H02M 1/088* (2013.01); *H02M 1/4208* (2013.01); *H02M 2001/0009* (2013.01)

(58) Field of Classification Search
CPC ......... H02M 3/33507; H02M 3/33523; H02M 1/4258; H02M 2001/0022; H02M 2001/0025; H02M 3/156
See application file for complete search history.

(56) References Cited

U.S. PATENT DOCUMENTS 5,615,097 A * 3/1997 Cross ................... H02H 7/1252
361/111
6,529,073 B1 * 3/2003 Highfill, III ............ H03F 1/523
330/207 P (Continued)

*Primary Examiner* — Timothy J Dole
*Assistant Examiner* — Sisay G Tiku
(74) *Attorney, Agent, or Firm* — Tung & Associates

(57) ABSTRACT

The present invention provides a switching regulator with PFC function and a control circuit and a control method thereof. The switching regulator with PFC function includes a power stage circuit, a current sense circuit, and a control circuit. The power stage circuit operates at least one power switch therein according to an operation signal to convert an input voltage to an output voltage. When a transient voltage of the input voltage exceeds a transient voltage upper limit, or when a transient slew rate of the input voltage exceeds a transient slew rate upper limit, the control circuit adjusts a frequency response gain from a stable state frequency response gain to a transient state frequency response gain, such that a transient current of an output current does not exceed a current upper limit, and/or that a transient response time of the output current does not exceed a threshold transient time period.

17 Claims, 9 Drawing Sheets

(56) References Cited

U.S. PATENT DOCUMENTS

| | | | | |
|---|---|---|---|---|
| 6,775,160 | B2* | 8/2004 | Siri | H02M 1/4208 363/125 |
| 7,193,872 | B2* | 3/2007 | Siri | H02M 3/33592 363/95 |
| 9,367,072 | B2* | 6/2016 | Al-Shyoukh | G05F 1/468 |
| 2006/0055433 | A1* | 3/2006 | Yang | H02M 3/33507 327/10 |
| 2006/0152205 | A1* | 7/2006 | Tang | H02M 3/1584 323/284 |
| 2008/0252277 | A1* | 10/2008 | Sase | H02M 3/157 323/283 |
| 2012/0049908 | A1* | 3/2012 | Karlsson | H02M 3/157 327/154 |
| 2012/0200331 | A1* | 8/2012 | Karlsson | H02M 3/156 327/175 |
| 2014/0266122 | A1* | 9/2014 | Zhu | H02M 3/156 323/284 |
| 2017/0264185 | A1* | 9/2017 | Karlsson | H02M 1/12 |

* cited by examiner

SWITCHING REGULATOR WITH PFC FUNCTION AND CONTROL CIRCUIT AND CONTROL METHOD THEREOF

CROSS REFERENCE

The present invention claims priority to U.S. 62/336,308, filed on May 13, 2016.

BACKGROUND OF THE INVENTION

Field of Invention

The present invention relates to a switching regulator with a PFC (Power Factor Correction) function and a control circuit and a control method thereof; particularly, it relates to such switching regulator and control circuit and control method thereof, wherein when a transient voltage of an input voltage exceeds a transient voltage upper limit, or when a transient slew rate of the input voltage exceeds a transient slew rate upper limit, a frequency response gain of the switching regulator is adjusted such that the switching regulator can operate more stably.

Description of Related Art

FIG. 1A shows a conventional switching regulator 100 with a PFC function, for supplying electrical power to a light emitting device circuit (not shown). FIGS. 1B and 1C show schematic diagrams of signal waveforms related to the operation of the switching regulator 100. As shown in FIG. 1A, a rectifier circuit 10 rectifies an alternating current (AC) voltage Vac to generate an input voltage Vin. A signal waveform of the input voltage Vin is shown in FIG. 1B. A power stage circuit 103 of the switching regulator 100 has a primary winding W1, which receives the input voltage Vin. A power switch SW in the power stage circuit 103 controls the conduction time of the primary winding W1, so as to generate an output voltage Vout at a secondary winding W2. The power switch SW is controlled by a control circuit 105. The control circuit 105 performs a feedback control. A current sense circuit 107 generates a current sense signal CS according to a current flowing through the power switch SW. Besides, a tertiary winding W3 generates a zero current sense signal ZCD according to the output voltage Vout and an internal voltage supply VDD. The control circuit 105 generates an operation signal GD according to the current sense signal CS and the zero current sense signal ZCD, to control the power switch SW, so as to convert the input voltage Vin to the output voltage Vout, and to generate an output current Iout.

Still referring to FIG. 1A, for increasing the power conversion efficiency, the control circuit 105 generates the operation signal GD to control the power switch SW in such a way that the output current Iout and the input voltage Vin are in phase. That is, the switching regulator 100 includes a PFC circuit, which is a power conversion circuit including a power switch and an inductor. The PFC circuit may be embodied in many ways as well known by those skilled in the art, so details thereof are omitted here.

The conventional switching regulator 100 with PFC function, which has a fly-back structure and regulates the output current Iout at a predetermined level, typically has a frequency response gain whose unit gain bandwidth is around 10 Hz. FIGS. 1B and 1C show schematic diagrams of related signal waveforms during the operation of the switching regulator 100. When a transient voltage Vint of the input voltage Vin exceeds a threshold level, the output current Iout will exceed a current upper limit Iupl, and the switching regulator 100 will be shut down by over current protection mechanism, as shown by FIG. 1B. Or, the transient response time Ttransistor of the output current Iout may exceed a threshold transient time period, causing flicker of a light emitting device circuit operating according to the output current Iout.

More specifically, FIG. 1B shows a schematic diagram of signal waveforms related to a situation wherein an amplitude of the input voltage Vin changes from a low level to a high level at time point t1, causing the transient voltage Vint to exceed the threshold level. The transient voltage Vint is a voltage difference between a previous peak and a following peak of the input voltage Vin. There are many possible causes for the input voltage Vin to suddenly jump from a low level to a high level and the transient voltage Vint to exceed the threshold level; for example, one possible cause is an abrupt change of loading, or, another possible cause is that another load circuit which consumes high electrical power, such as a motor or a heater, is commonly connected to the AC voltage Vac to share the electrical power, and is turned ON and in a transient condition consuming high power. When the load circuit abruptly consumes high power, the transient voltage Vint of the input voltage Vin will exceed the threshold level, so that the output current Iout will exceed a current upper limit Iupl. Because the power switch SW in the switching regulator 100 switches with a high frequency, the waveforms of the current sense signal CS and the power switch voltage are shown in FIG. 1B to switch with a high frequency, which is illustrated by a smaller figure.

FIG. 1C shows a schematic diagram of signal waveforms related to a situation wherein an amplitude of the input voltage Vin changes from a high level to a low level at time point t2, causing the transient voltage Vint to exceed the threshold level. When the input voltage Vin changes from a high level to a low level, and the transient voltage Vint of the input voltage Vin exceeds the threshold level, a transient response time Ttr of the output current Iout will exceed a threshold transient time period, wherein the transient response time is a time period from the start of a transient state to reaching normal operation. Because the transient response time Ttr of the output current Iout exceeds the threshold transient time period, the output current Iout is not stable, which for example can cause flicker of a light emitting device circuit which operates according to the output current Iout.

In view of above, the present invention proposes a switching regulator with PFC function and a control circuit and a control method thereof. The switching regulator with PFC function adjusts the frequency response gain when the transient voltage of the input voltage exceeds a transient voltage upper limit, so as to prevent the switching regulator from undesired shut down or providing an unstable output current to cause flicker of the light emitting device circuit.

SUMMARY OF THE INVENTION

From one perspective, the present invention provides a switching regulator with a power factor correction (PFC) function, comprising: a power stage circuit, configured to operably operate at least one power switch therein according to an operation signal, to convert an input voltage to an output voltage, and to generate an output current; a current sense circuit, which is coupled to the power stage circuit, and is configured to operably generate a current sense signal according to a switch current flowing through the power switch; and a control circuit, which is coupled to the power stage circuit and the current sense circuit, and is configured to operably generate the operation signal according to the input voltage and the current sense signal; wherein when a transient voltage of the input voltage exceeds a transient voltage upper limit, or when a transient slew rate of the input voltage exceeds a transient slew rate upper limit, the control circuit adjusts a frequency response gain from a stable state frequency response gain to a transient state frequency response gain, such that the output current does not exceed a current upper limit, and/or that a transient response time of the output current does not exceed a threshold transient time period.

In one preferable embodiment, when the transient voltage of the input voltage does not exceed a stable voltage upper limit, or when the transient slew rate of the input voltage does not exceed a stable slew rate upper limit, the control circuit adjusts the frequency response gain from the transient state frequency response gain to the stable state frequency response gain.

In one preferable embodiment, after the control circuit counts a predetermined recovery period from a start time point, the control circuit adjusts the frequency response gain from the transient state frequency response gain to the stable state frequency response gain, wherein the start time point is a beginning when the frequency response gain is adjusted from the stable state frequency response gain to the transient state frequency response gain.

In one preferable embodiment, the control circuit includes: a waveform analysis circuit, which is coupled to the power stage circuit, and configured to operably generate a transient variation signal according to the input voltage; a gain control circuit, which is coupled to the current sense circuit and the waveform analysis circuit, and configured to operably generate a compensation signal according to the current sense signal and the transient variation signal; and an operation signal generation circuit, which is coupled to the gain control circuit and the power stage circuit, and configured to operably generate the operation signal according to the compensation signal.

In one preferable embodiment, the gain control circuit includes: a controlled current source circuit, configured to operably generate a controlled current according to the current sense signal; and a gain switching circuit, which is coupled to the waveform analysis circuit and the controlled current source circuit, and is configured to operably control a gain adjustment switch according to the transient variation signal, to determine whether the frequency response gain is the stable state frequency response gain or the transient state frequency response gain, so as to generate the compensation signal.

In one preferable embodiment, the control circuit further includes: a time setting circuit, configured to operably generate a setting signal according to a time setting; and a timer circuit, which is coupled to the time setting circuit and the waveform analysis circuit, and is configured to operably generate a transient status end signal according to the setting signal and the transient variation signal, wherein the transient status end signal is inputted to the gain control circuit; wherein the gain switching circuit controls the gain adjustment switch further according to the transient status end signal, to determine whether the frequency response gain is the stable state frequency response gain or the transient state frequency response gain, so as to generate the compensation signal.

In one preferable embodiment, the waveform analysis circuit generates the transient variation signal according to the transient slew rate of the input voltage or a peak-to-peak-to-peak difference of the input voltage.

In one preferable embodiment, the waveform analysis circuit includes: a sample and hold circuit, configured to operably generate a first voltage of an earlier time point according to the input voltage; an earlier-later comparison circuit, configured to operably compare the first voltage of the earlier time point with a second voltage of a later time point, to generate a comparison result, wherein the second voltage is related to the input voltage at the later time point; and a logic circuit, which is coupled to the earlier-later comparison circuit, and is configured to operably generate the transient variation signal according to the comparison result.

In one preferable embodiment, the waveform analysis circuit includes: a peak hold circuit, configured to operably hold a present peak voltage of the input voltage in a present period; a buffer circuit, which is coupled to the peak hold circuit, and is configured to operably store the present peak voltage temporarily as an earlier peak voltage in a next period; and a comparison circuit, which is coupled to the peak hold circuit and the buffer circuit, and is configured to operably compare the present peak voltage with the earlier peak voltage, to generate the transient variation signal.

From another perspective, the present invention provides a control circuit of a switching regulator with a power factor correction (PFC) function, wherein the switching regulator includes a power stage circuit, configured to operably operate at least one power switch therein according to an operation signal, to convert an input voltage to an output voltage, and to generate an output current; a current sense circuit, which is coupled to the power stage circuit, and is configured to operably generate a current sense signal according to a switch current flowing through the power switch; and the control circuit, which is coupled to the power stage circuit and the current sense circuit, and is configured to operably generate the operation signal according to the input voltage and the current sense signal; the control circuit comprising: a waveform analysis circuit, which is coupled to the power stage circuit, and configured to operably generate a transient variation signal according to the input voltage; a gain control circuit, which is coupled to the current sense circuit and the waveform analysis circuit, and configured to operably generate a compensation signal according to the current sense signal and the transient variation signal; and an operation signal generation circuit, which is coupled to the gain control circuit and the power stage circuit, and configured to operably generate the operation signal according to the compensation signal; wherein when a transient voltage of the input voltage exceeds a transient voltage upper limit, or when a transient slew rate of the input voltage exceeds a transient slew rate upper limit, the control circuit adjusts a frequency response gain from a stable state frequency response gain to a transient state frequency response gain, such that the output current does not exceed a current upper limit, and/or that a transient response time of the output current does not exceed a threshold transient time period.

In one preferable embodiment, when the transient voltage of the input voltage does not exceed a stable voltage upper limit, or when the transient slew rate of the input voltage does not exceed a stable slew rate upper limit, the control circuit adjusts the frequency response gain from the transient state frequency response gain to the stable state frequency response gain.

In one preferable embodiment, after the control circuit counts a predetermined recovery period from a start time point, the control circuit adjusts the frequency response gain from the transient state frequency response gain to the stable state frequency response gain, wherein the start time point is a beginning when the frequency response gain is adjusted from the stable state frequency response gain to the transient state frequency response gain.

In one preferable embodiment, the gain control circuit includes: a controlled current source circuit, configured to operably generate a controlled current according to the current sense signal; and a gain switching circuit, which is coupled to the waveform analysis circuit and the controlled current source circuit, and is configured to operably control a gain adjustment switch according to the transient variation signal, to determine whether the frequency response gain is the stable state frequency response gain or the transient state frequency response gain, so as to generate the compensation signal.

In one preferable embodiment, the control circuit further includes: a time setting circuit, configured to operably generate a setting signal according to a time setting; and a timer circuit, which is coupled to the time setting circuit and the waveform analysis circuit, and is configured to operably generate a transient status end signal according to the setting signal and the transient variation signal, wherein the transient status end signal is inputted to the gain control circuit; wherein the gain switching circuit controls the gain adjustment switch further according to the transient status end signal, to determine whether the frequency response gain is the stable state frequency response gain or the transient state frequency response gain, so as to generate the compensation signal.

In one preferable embodiment, the waveform analysis circuit generates the transient variation signal according to the transient slew rate of the input voltage or a peak-to-peak difference of the input voltage.

In one preferable embodiment, the waveform analysis circuit includes: a sample and hold circuit, configured to operably generate a first voltage of an earlier time point according to the input voltage; an earlier-later comparison circuit, configured to operably compare the first voltage of the earlier time point with a second voltage of a later time point, to generate a comparison result, wherein the second voltage is related to the input voltage at the later time point; and a logic circuit, which is coupled to the earlier-later comparison circuit, and is configured to operably generate the transient variation signal according to the comparison result.

In one preferable embodiment, the waveform analysis circuit includes: a peak hold circuit, configured to operably hold a present peak voltage of the input voltage in a present period; a buffer circuit, which is coupled to the peak hold circuit, and is configured to operably store the present peak voltage temporarily as an earlier peak voltage in a next period; and a comparison circuit, which is coupled to the peak hold circuit and the buffer circuit, and is configured to operably compare the present peak voltage with the earlier peak voltage, to generate the transient variation signal.

From another perspective, the present invention provides a control method of a switching regulator with a power factor correction (PFC) function, comprising: operating at least one power switch according to an operation signal, to convert an input voltage to an output voltage, and to generate an output current; generating a current sense signal according to a switch current flowing through the power switch; generating the operation signal according to the input voltage and the current sense signal; and when a transient voltage of the input voltage exceeds a transient voltage upper limit, or when a transient slew rate of the input voltage exceeds a transient slew rate upper limit, adjusting a frequency response gain from a stable state frequency response gain to a transient state frequency response gain, such that the output current does not exceed a current upper limit, and/or that a transient response time of the output current does not exceed a threshold transient time period.

In one preferable embodiment, the control method further comprises: when the transient voltage of the input voltage does not exceed a stable voltage upper limit, or when the transient slew rate of the input voltage does not exceed a stable slew rate upper limit, adjusting the frequency response gain from the transient state frequency response gain to the stable state frequency response gain.

In one preferable embodiment, the control method further comprises: after counting a predetermined recovery period from a start time point, adjusting the frequency response gain from the transient state frequency response gain to the stable state frequency response gain, wherein the start time point is a beginning when the frequency response gain is adjusted from the stable state frequency response gain to the transient state frequency response gain.

In one preferable embodiment, the step of generating the operation signal according to the input voltage and the current sense signal includes: generating a transient variation signal according to the input voltage; generating a compensation signal according to the current sense signal and the transient variation signal; and generating the operation signal according to the compensation signal.

In one preferable embodiment, the step of generating a compensation signal according to the current sense signal and the transient variation signal includes: generating a controlled current according to the current sense signal; and controlling a gain adjustment switch according to the transient variation signal, to determine whether the frequency response gain is the stable state frequency response gain or the transient state frequency response gain, so as to generate the compensation signal.

In one preferable embodiment, the step of controlling a gain adjustment switch according to the transient variation signal, to determine whether the frequency response gain is the stable state frequency response gain or the transient state frequency response gain, so as to generate the compensation signal further includes: generating a setting signal according to a time setting; generating a transient status end signal according to the setting signal and the transient variation signal; and controlling the gain adjustment switch further according to the transient status end signal, to determine whether the frequency response gain is the stable state frequency response gain or the transient state frequency response gain, so as to generate the compensation signal.

In one preferable embodiment, the step of generating a transient variation signal according to the input voltage includes: generating the transient variation signal according to the transient slew rate of the input voltage or a peak-to-peak difference of the input voltage.

In one preferable embodiment, the step of generating a transient variation signal according to the input voltage includes: generating a first voltage of an earlier time point according to the input voltage; comparing the first voltage of the earlier time point with a second voltage of a later time point, to generate a comparison result, wherein the second voltage is related to the input voltage at the later time point; and generating the transient variation signal according to the comparison result.

In one preferable embodiment, the step of generating a transient variation signal according to the input voltage includes: holding a present peak voltage of the input voltage in a present period; storing the present peak voltage temporarily as an earlier peak voltage in a next period; and comparing the present peak voltage with the earlier peak voltage, to generate the transient variation signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1A:
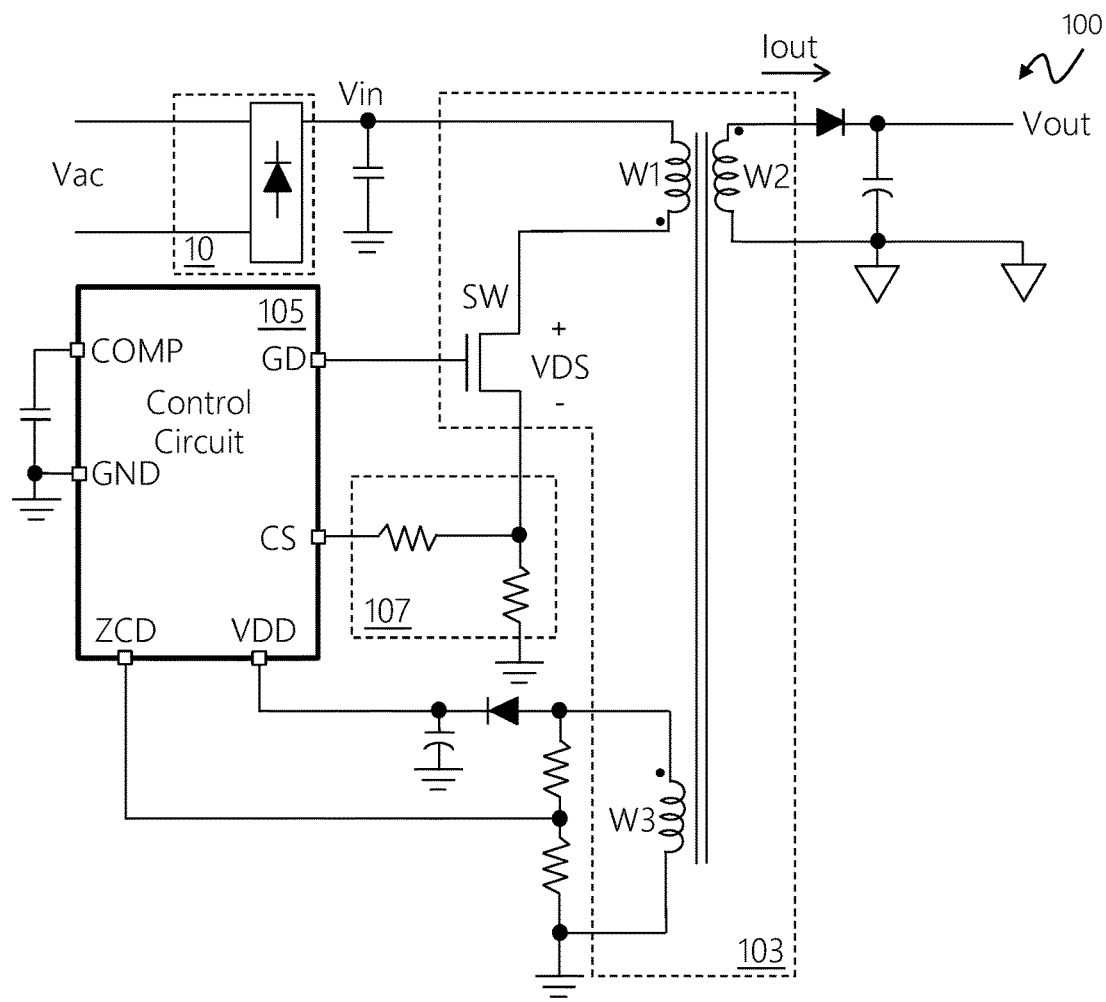
FIG. 1A shows a conventional switching regulator 100 with a power factor correction (PFC) function.
Figure 1B:
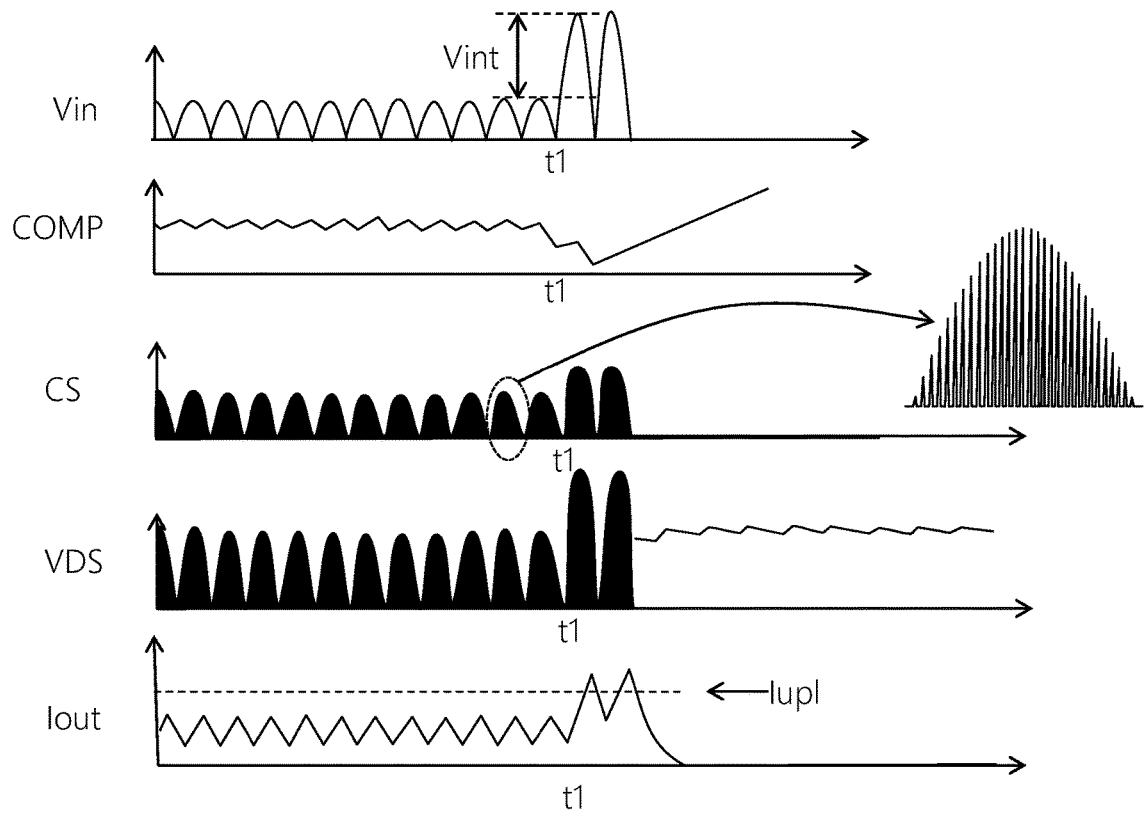
FIGS. 1B and 1C show schematic diagrams of signal waveforms related to an operation of the switching regulator 100.
Figure 1C:
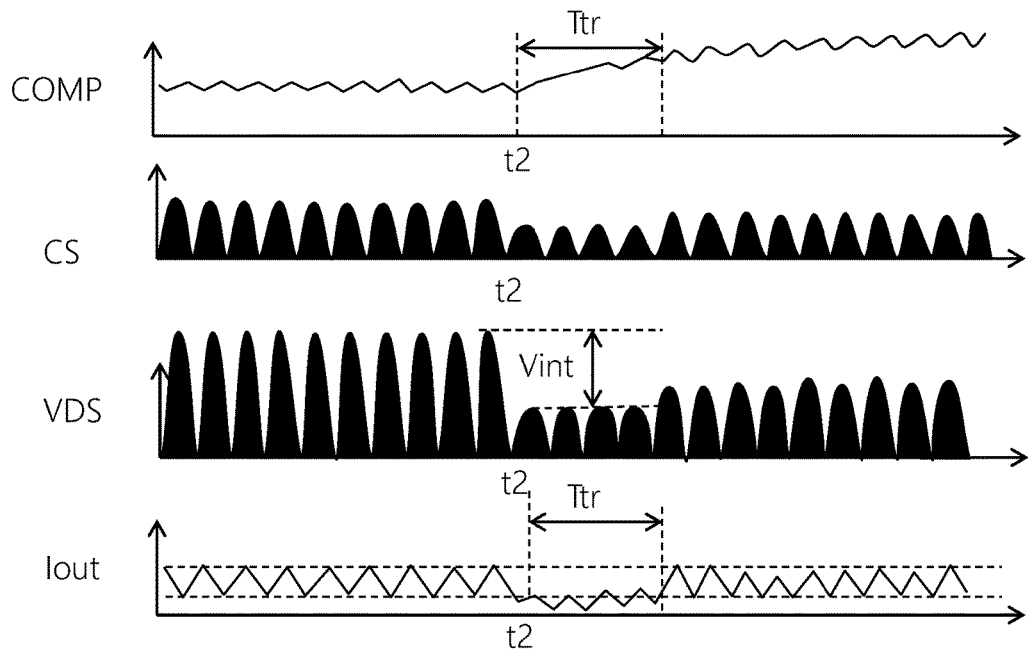
Figure 2:
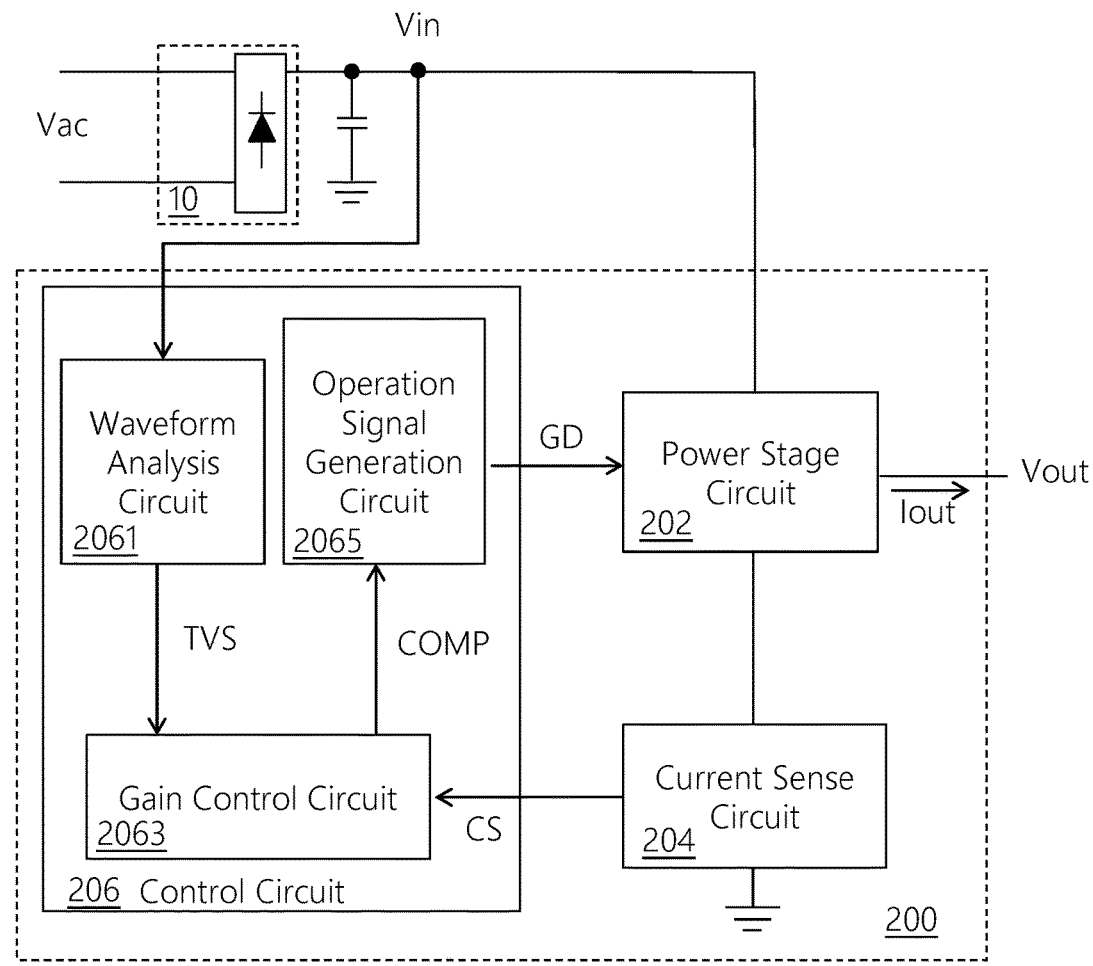
FIG. 2 shows an embodiment of a switching regulator 200 according to the present invention.
Figure 3A:
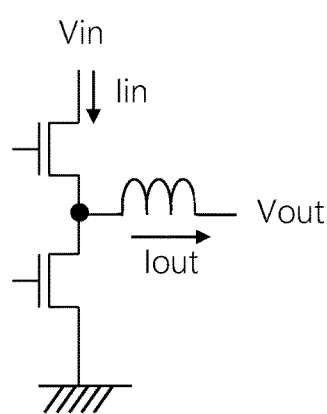
FIGS. 3A-3K show synchronous and asynchronous buck, boost, inverting, buck-boost, inverting-boost, and flyback power stage circuits.
Figure 3B:
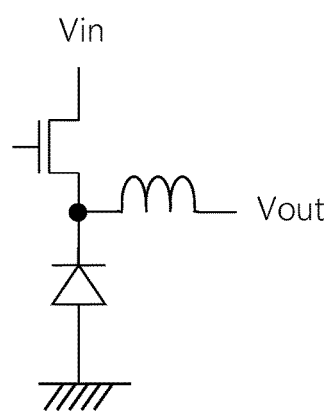
Figure 3C:
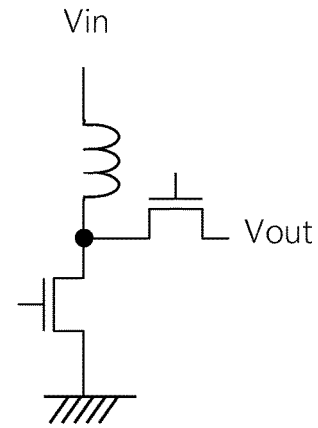
Figure 3D:
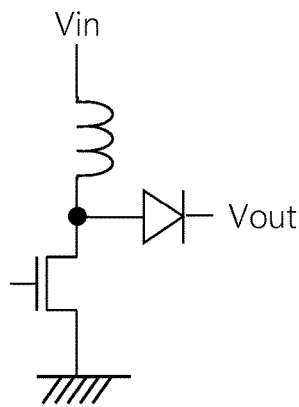
Figure 3E:
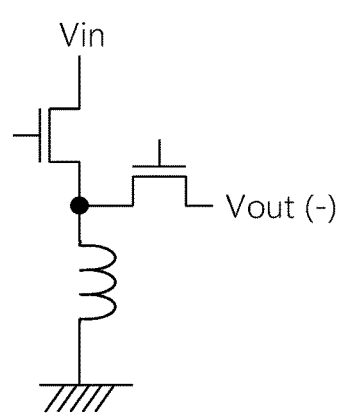
Figure 3F:
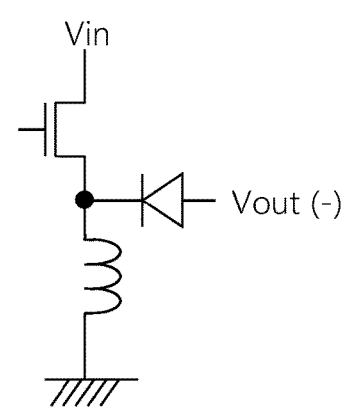
Figure 3G:
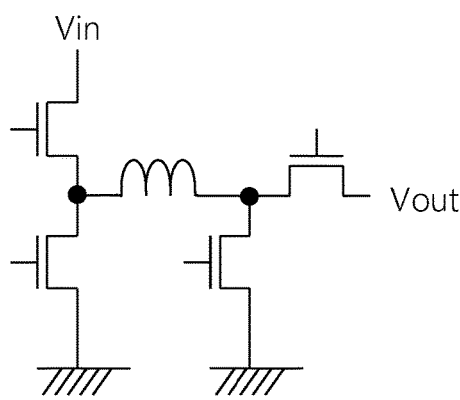
Figure 3H:
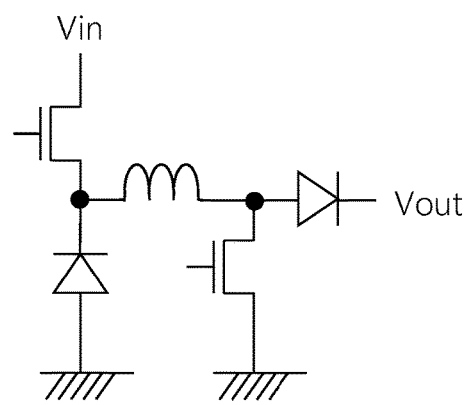
Figure 3I:
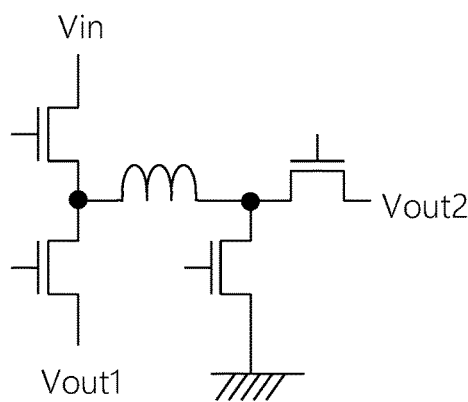
Figure 3J:
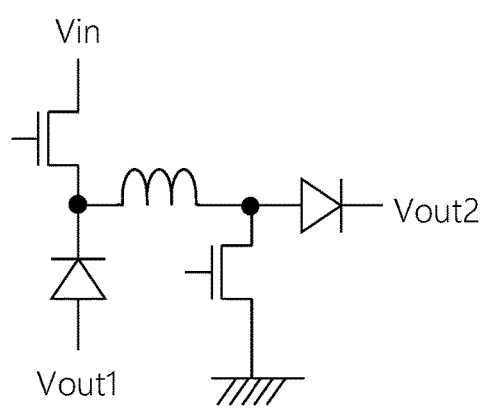
Figure 3K:
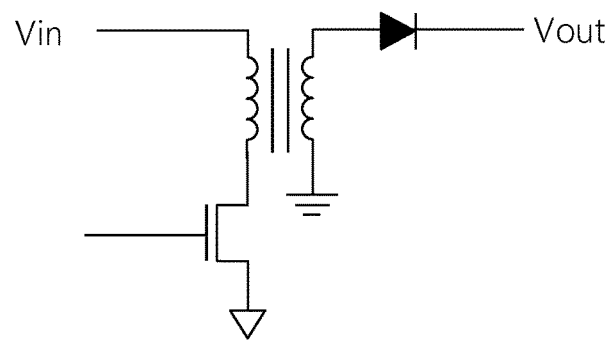

Please refer to FIG. 2 for an embodiment of a switching regulator 200 with power factor correction (PFC) function according to the present invention. As shown in FIG. 2, the rectifier circuit 10 rectifies the alternating current (AC) voltage Vac to generate an input voltage Vin. The rectifier circuit 10 is for example a bridge rectifier circuit. The signal waveform of the input voltage Vin is shown in FIG. 1B. The switching regulator 200 includes a power stage circuit 202, a current sense circuit 204, and a control circuit 206. The power stage circuit 202 operates at least one power switch therein according to an operation signal GD, to convert the input voltage Vin to the output voltage Vout, and to generate an output current Iout.

In this embodiment, the current sense circuit 204 is coupled to the power stage circuit 202, and is configured to operably generate a current sense signal CS according to a switch current flowing through the power switch. The control circuit 206 is coupled to the power stage circuit 202 and the current sense circuit 204, and is configured to operably generate the operation signal GD according to the input voltage Vin and the current sense signal CS. When a transient voltage Vint of the input voltage Vin exceeds the transient voltage upper limit, or when the transient slew rate of the input voltage Vin exceeds the transient slew rate upper limit, the control circuit 206 adjusts a frequency response gain from a stable state frequency response gain to a transient state frequency response gain, such that the output current Iout does not exceed the current upper limit, and/or that the transient response time Ttr of the output current does not exceed the threshold transient time period.

The power stage circuit 202 may be a synchronous or asynchronous buck, boost, inverting, buck-boost, inverting-boost, or flyback power stage circuit as shown in FIGS. 3A-3K. In this embodiment, the control circuit 206 includes: a waveform analysis circuit 2061, which is coupled to the power stage circuit 202, and configured to operably generate a transient variation signal TVS according to the input voltage Vin; a gain control circuit 2063, which is coupled to the current sense circuit 204 and the waveform analysis circuit 2061, and configured to operably generate a compensation signal COMP according to the current sense signal CS and the transient variation signal TVS; and an operation signal generation circuit 2065, which is coupled to the gain control circuit 2063 and the power stage circuit 202, and configured to operably generate the operation signal GD according to the compensation signal COMP.

The transient voltage Vint for example is a voltage difference between a previous peak and a following peak of the input voltage Vin. The transient voltage upper limit for example is a predetermined level which is set by a user. According to the present invention, in one embodiment, when the transient voltage Vint of the input voltage Vin exceeds the transient voltage upper limit, the control circuit 206 adjusts a frequency response gain from a stable state frequency response gain to a transient state frequency response gain; thus, by adjusting the mechanism of feedback control, the present invention can prevent the output current Iout from exceeding the current upper limit Iupl, and/or prevent the transient response time Ttr of the output current Iout from exceeding a threshold transient time period. As described above, when the output current Iout exceeds the current upper limit Iupl, the switching regulator 200 will be shut down because of over current protection. When the transient response time Ttr of the output current Iout exceeds the threshold transient time period, the output current Iout is not stable, and therefore it may cause for example flicker of a light emitting device circuit which operates according to the output current Iout.

The transient slew rate of the input voltage Vin for example is a slew rate difference between a previous period and a following period, of the input voltage Vin at a same phase. The transient slew rate upper limit for example is a predetermined level which is set by a user. According to the present invention, in another embodiment, when the transient slew rate of the input voltage Vin exceeds the transient slew rate upper limit, the control circuit 206 adjusts a frequency response gain from the stable state frequency response gain to the transient state frequency response gain; thus, by adjusting the mechanism of feedback control, the present invention can prevent the output current Iout from exceeding the current upper limit Iupl, and/or prevent the transient response time Ttr of the output current Iout from exceeding a threshold transient time period.

In one preferable embodiment, when the transient voltage Vint of the input voltage Vin does not exceed a stable voltage upper limit, or when the transient slew rate of the input voltage Vin does not exceed a stable slew rate upper limit, the control circuit 206 adjusts the frequency response gain from the transient state frequency response gain to the stable state frequency response gain. That is, after the input voltage Vin becomes stable, i.e., after the unstable transient period of the input voltage Vin ends, the transient voltage Vint of the input voltage Vin and the transient slew rate of the input voltage Vin will decrease. Therefore, a user may set the stable voltage upper limit and the stable slew rate upper limit, as reference thresholds for the control circuit 206 to determine whether to adjust the frequency response gain from the transient state frequency response gain back to the stable state frequency response gain.

In another preferable embodiment, after the control circuit 206 counts a predetermined recovery period from a start time point, the control circuit 206 adjusts the frequency response gain from the transient state frequency response gain to the stable state frequency response gain, wherein the start time point is a beginning when the frequency response gain is adjusted from the stable state frequency response gain to the transient state frequency response gain. That is, the user may estimate and predetermine a time period from the beginning of the transient status, as a recovery period for the switching regulator 200 to return to the stable status. When this predetermined recovery period ends, it is assumed that the input voltage Vin becomes stable, and the control circuit 206 may adjust the frequency response gain from the transient state frequency response gain back to the stable state frequency response gain at or after the end of the predetermined recovery period.

Figure 4:
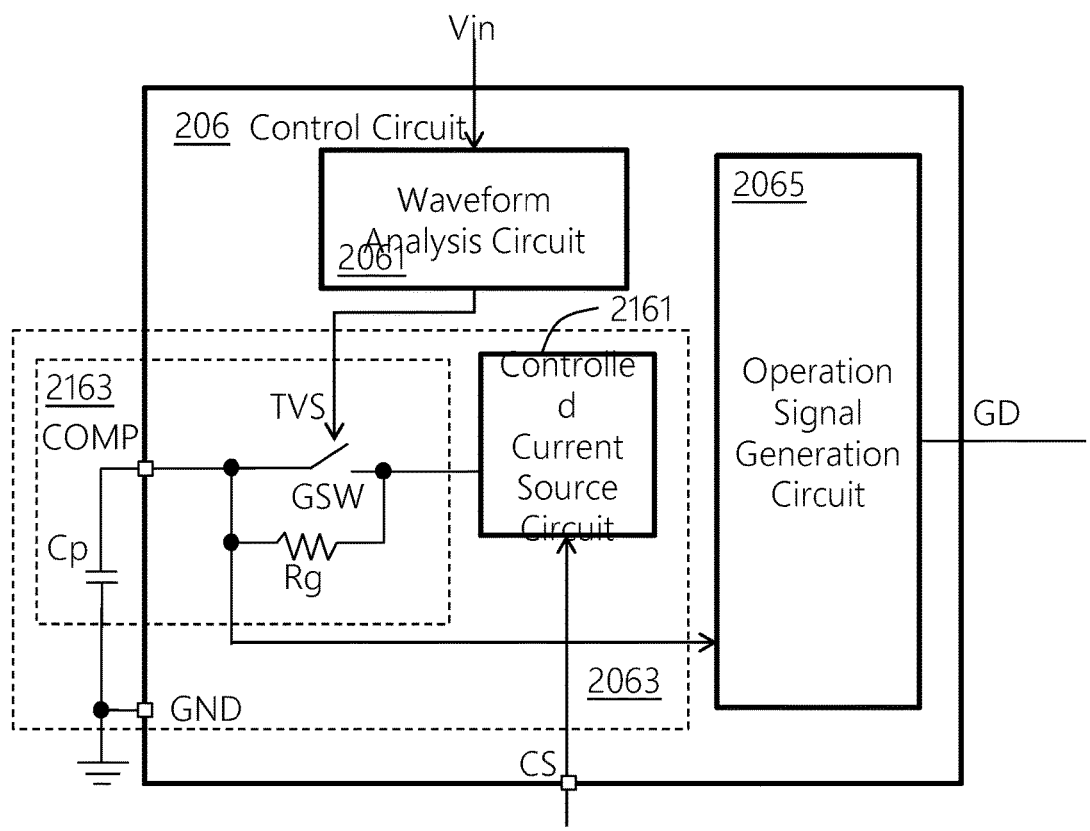
FIG. 4 shows a more specific embodiment of a control circuit 206 according to the present invention.

FIG. 4 shows a more specific embodiment of the control circuit 206 according to the present invention. As shown in the figure, the control circuit 206 includes: the waveform analysis circuit 2061, the gain control circuit 2063, and the operation signal generation circuit 2065. The gain control circuit 2063 includes a controlled current source circuit 2161 and a gain switching circuit 2163. The controlled current source circuit 2161 is configured to operably generate a controlled current according to the current sense signal CS. The gain switching circuit 2163 is coupled to the waveform analysis circuit 2061 and the controlled current source circuit 2161, and is configured to operably control a gain adjustment switch GSW according to the transient variation signal TVS, to determine whether the frequency response gain is the stable state frequency response gain or the transient state frequency response gain, so as to generate the compensation signal COMP.

As shown in the figure, the gain switching circuit 2163 for example includes a gain capacitor Cp, the gain adjustment switch GSW, and a gain resistor Rg, wherein the gain adjustment switch GSW and the gain resistor Rg are connected in parallel. In the gain switching circuit 2163, the gain capacitor Cp for example provides a main pole. In stable normal operation, the transient variation signal TVS keeps the gain adjustment switch GSW ON, and therefore, the main pole of the frequency response gain of the switching regulator 200 is determined by the gain capacitor Cp. When the transient variation signal TVS, generated by the waveform analysis circuit 2061, indicates that the transient voltage Vint of the input voltage Vin exceeds the transient voltage upper limit, or that the transient slew rate of the input voltage Vin exceeds the transient slew rate upper limit, the transient variation signal TVS turns OFF the gain adjustment switch GSW. Thus, the frequency response gain of the switching regulator 200 is adjusted by the gain resistor Rg, which is connected to the gain capacitor Cp in series. This is equivalent to adding a zero to the frequency response gain of the switching regulator 200. Therefore, the frequency response gain is adjusted from the stable state frequency response gain to the transient state frequency response gain, whereby the unit gain frequency bandwidth is increased temporarily, so that the output current Iout does not exceed the current upper limit, and/or that the transient response time of the output current Iout does not exceed the threshold transient time period.

Figure 5:
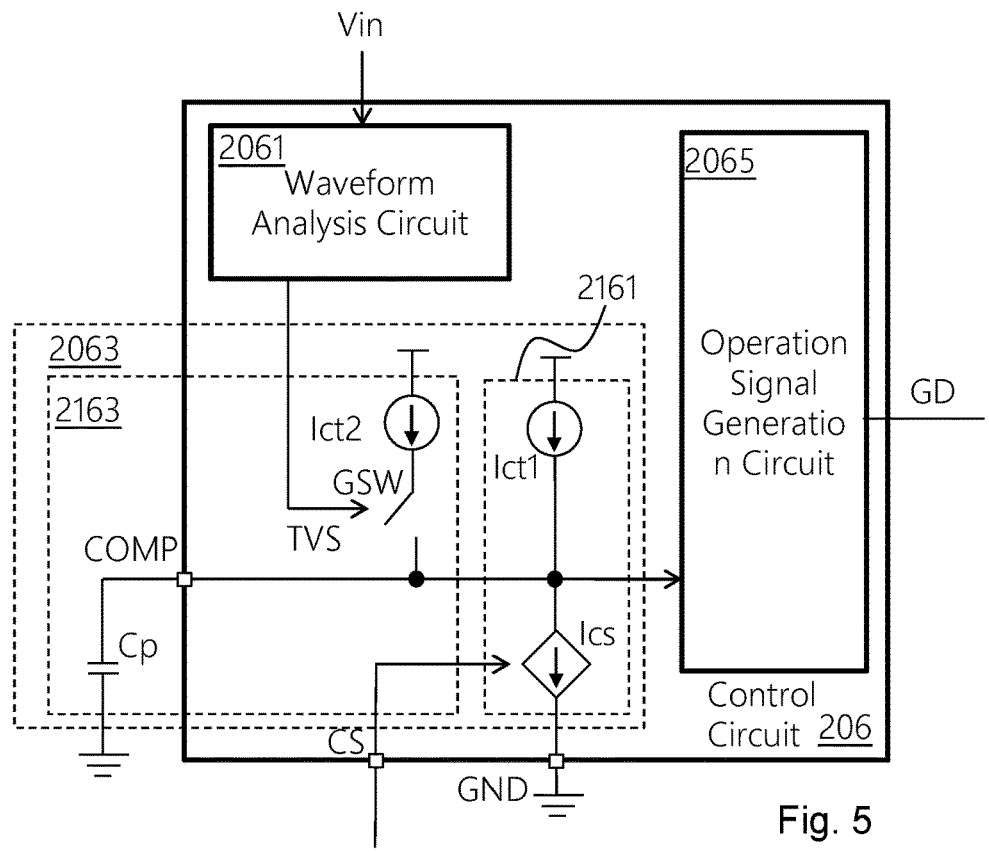
FIG. 5 shows another more specific embodiment of the control circuit 206 according to the present invention.

FIG. 5 shows another more specific embodiment of the control circuit 206 according to the present invention. As shown in the figure, the control circuit 206 includes: the waveform analysis circuit 2061, the gain control circuit 2063, and the operation signal generation circuit 2065. The gain control circuit 2063 includes the controlled current source circuit 2161 and the gain switching circuit 2163. The controlled current source circuit 2161 includes a constant current source Ict1 and a controlled current source Ics. The controlled current source Ics is configured to operably generate a controlled current according to the current sense signal CS. The gain switching circuit 2163 is coupled to the waveform analysis circuit 2061 and the controlled current source circuit 2161, and is configured to operably control a gain adjustment switch GSW according to the transient variation signal TVS, to determine whether the frequency response gain is the stable state frequency response gain or the transient state frequency response gain, so as to generate the compensation signal COMP.

As shown in the figure, the gain switching circuit 2163 for example includes the gain capacitor Cp, the gain adjustment switch GSW, and a constant current source Ict2, wherein the gain adjustment switch GSW and the constant current source Ict2 are connected in series. In the gain switching circuit 2163, the gain capacitor Cp for example provides a main pole. In the steady state normal operation, the transient variation signal TVS keeps the gain adjustment switch GSW OFF, and therefore, the main pole of the frequency response gain of the switching regulator 200 is determined by the gain capacitor Cp. When the transient variation signal TVS, generated by the waveform analysis circuit 2061, indicates that the transient voltage Vint of the input voltage Vin exceeds the transient voltage upper limit, or when the transient slew rate of the input voltage Vin exceeds the transient slew rate upper limit, the transient variation signal TVS turns ON the gain adjustment switch GSW. Thus, the frequency response gain of the switching regulator 200 is adjusted by a current provided by the constant current source Ict2, so that the frequency response gain of the switching regulator 200 is changed from the stable state frequency response gain to the transient state frequency response gain, i.e., the unit gain bandwidth of the frequency response gain of the switching regulator 200 is temporarily increased, such that the output current Iout does not exceed the current upper limit, and/or that the transient response time of the output current Iout does not exceed the threshold transient time period.

Figure 6:
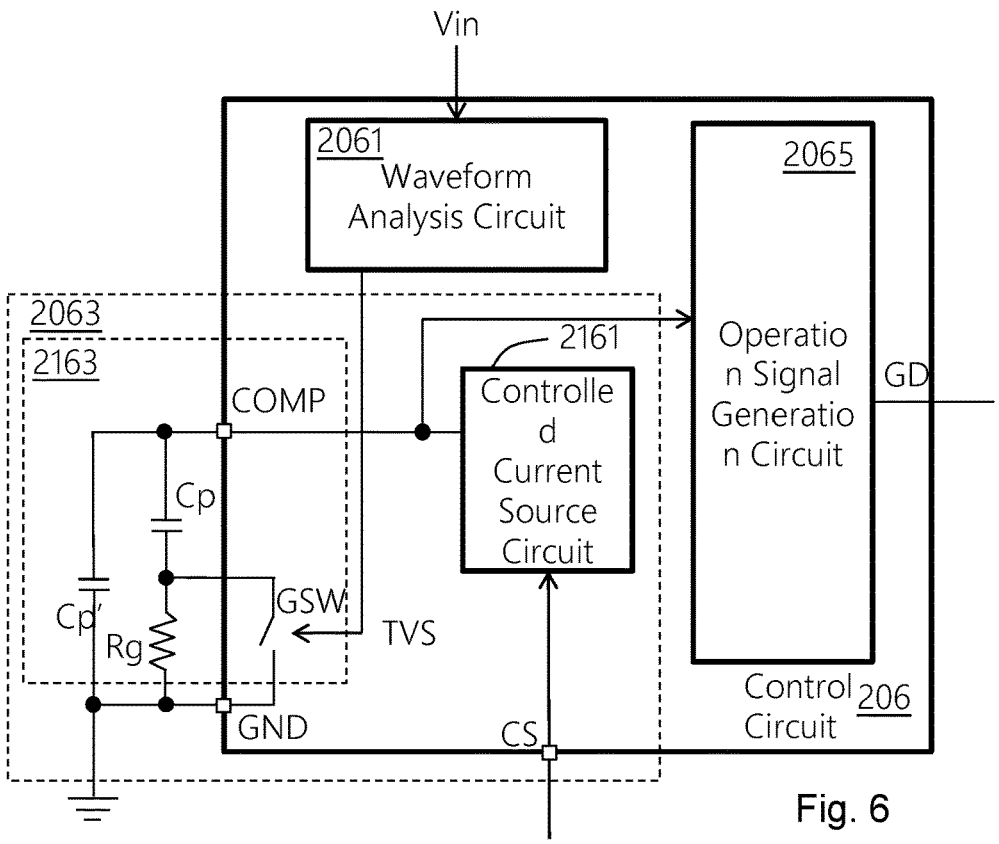
FIG. 6 shows another more specific embodiment of the control circuit 206 according to the present invention.

FIG. 6 shows another more specific embodiment of the control circuit 206 according to the present invention. As shown in the figure, the control circuit 206 includes: the waveform analysis circuit 2061, the gain control circuit 2063, and the operation signal generation circuit 2065. The gain control circuit 2063 includes the controlled current source circuit 2161 and the gain switching circuit 2163. The controlled current source circuit 2161 is configured to operably generate a controlled current according to the current sense signal CS. The gain switching circuit 2163 is coupled to the waveform analysis circuit 2061 and the controlled current source circuit 2161, and is configured to operably control a gain adjustment switch GSW according to the transient variation signal TVS, to determine whether the frequency response gain is the stable state frequency response gain or the transient state frequency response gain, so as to generate the compensation signal COMP.

As shown in the figure, the gain switching circuit 2163 for example includes gain capacitors Cp and Cp', the gain adjustment switch GSW, and the gain resistor Rg, wherein the gain adjustment switch GSW and the gain resistor Rg are connected in parallel. In the gain switching circuit 2163, the gain capacitors Cp and Cp' for example provides a main pole. In stable normal operation, the transient variation signal TVS keeps the gain adjustment switch GSW ON, and therefore, the main pole of the frequency response gain of the switching regulator 200 is determined by the gain capacitors Cp and Cp'. When the transient variation signal TVS, generated by the waveform analysis circuit 2061, indicates that the transient voltage Vint of the input voltage Vin exceeds the transient voltage upper limit, or that the transient slew rate of the input voltage Vin exceeds the transient slew rate upper limit, the transient variation signal TVS turns OFF the gain adjustment switch GSW. Thus, the frequency response gain of the switching regulator 200 is adjusted by the gain resistor Rg, which is connected to the gain capacitor Cp in series. This is equivalent to adding a zero to the frequency response gain of the switching regulator 200. Therefore, the frequency response gain is adjusted from the stable state frequency response gain to the transient state frequency response gain, and the unit gain frequency band is increased temporarily, so that the output current Iout does not exceed the current upper limit, and/or that the transient response time of the output current Iout does not exceed the threshold transient time period. This embodiment is different from the embodiment shown in FIG. 4 in that, in this embodiment, one more gain capacitor Cp' is added; besides, when the control circuit 206 is integrated in an integrated circuit (IC) chip, the gain resistor Rg may be located outside of the IC chip, to reduce the area of the IC chip.

Figure 7:
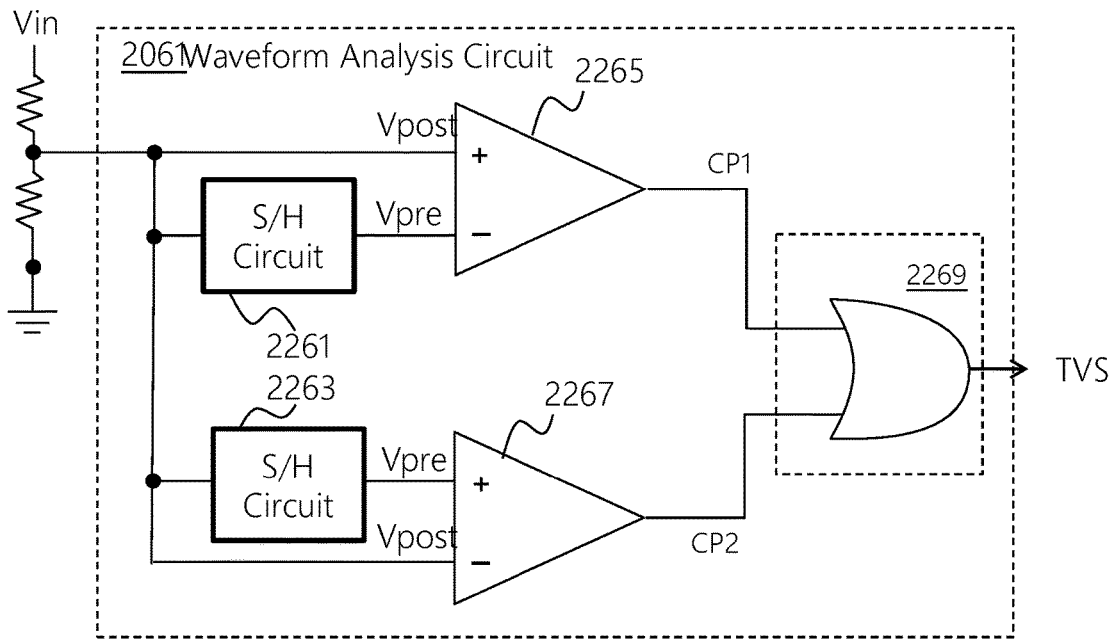
FIG. 7 shows an embodiment of the waveform analysis circuit 2061 according to the present invention.

FIG. 7 shows an embodiment of the waveform analysis circuit 2061 according to the present invention. As shown in the figure, the waveform analysis circuit 2061 includes: sample and hold circuits 2261 and 2263, earlier-later comparison circuits 2265 and 2267, and a logic circuit 2269. The sample and hold circuits 2261 and 2263, are configured to operably generate a voltage Vpre of an earlier time point according to the input voltage Vin. The earlier-later comparison circuits 2265 and 2267, are configured to operably compare the voltage Vpre of the earlier time point with a voltage Vpost of a later time point, to generate comparison results CP1 and CP2, wherein the voltage Vpost is related to the input voltage Vin at the later time point. The logic circuit 2269 is coupled to the earlier-later comparison circuits 2265 and 2267, and is configured to operably generate the transient variation signal TVS according to the comparison results CP1 and CP2. The voltage Vpre of the earlier time point indicates for example but not limited to a level or a slew rate related to the input voltage Vin at a predetermined phase; and the voltage Vpost of the later time point indicates for example but not limited to a level or a slew rate related to the input voltage Vin at the predetermined phase in the next (or a later) period. The logic circuit 2269 is for example but not limited to an OR logic gate as shown in the figure. That is, when a voltage difference of the input voltage Vin, i.e., the transient voltage Vint, from period to period, exceeds the transient voltage upper limit, or when the slew rate of the input voltage Vin, from period to period, exceeds the transient slew rate upper limit, the transient variation signal TVS triggers the gain control circuit 2063 to switch the gain adjustment switch GSW, whereby the frequency response gain changes from the stable state frequency response gain to the transient state frequency response gain, such that the output current Iout does not exceed the current upper limit Iupl, and/or that the transient response time Ttr of the output current Iout does not exceed the threshold transient time period, so as to prevent the switching regulator 200 from being shut down, to prevent the output current Iout from being unstable, and/or to avoid flicker of a light emitting device circuit which operates according to the output current Iout.

Figure 8:
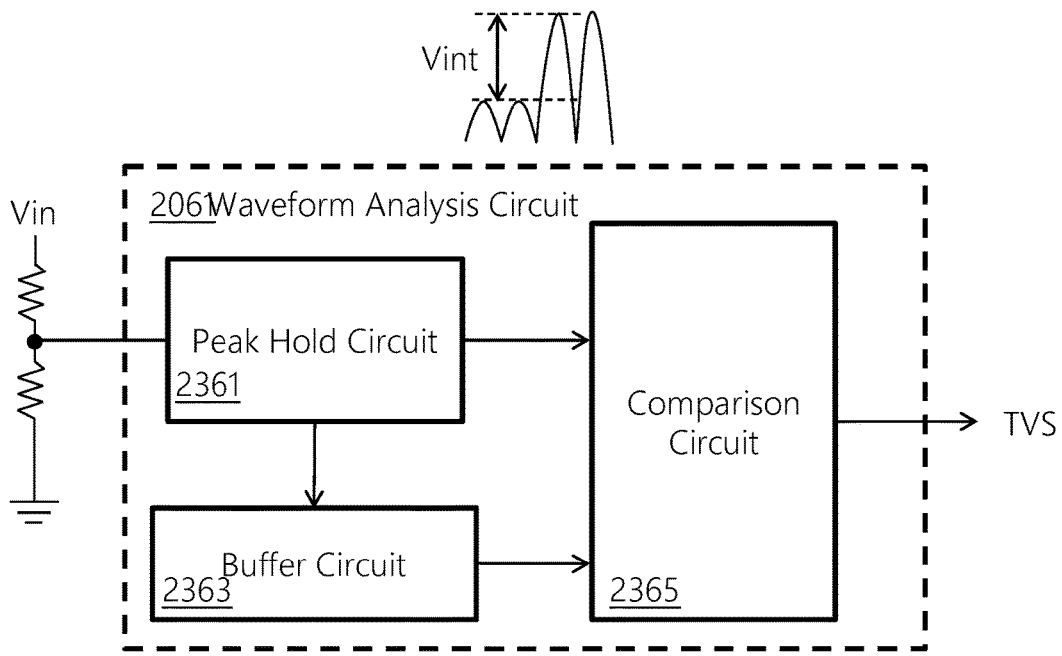
FIG. 8 shows another embodiment of the waveform analysis circuit 2061 according to the present invention.

FIG. 8 shows another embodiment of the waveform analysis circuit 2061 according to the present invention. As shown in the figure, the waveform analysis circuit 2061 includes: a peak hold circuit 2361, a buffer circuit 2363, and a comparison circuit 2365. The peak hold circuit 2361 is configured to operably hold a present peak voltage of the input voltage Vin in a present period. The peak hold circuit 2361 for example may hold a peak voltage of a divided voltage of the input voltage Vin at the present period. The buffer circuit 2363 is coupled to the peak hold circuit 2361, and is configured to operably store the present peak voltage temporarily as the earlier peak voltage in the next period. The comparison circuit 2365 is coupled to the peak hold circuit 2361 and the buffer circuit 2363, and is configured to operably compare the present peak voltage with the earlier peak voltage, to generate the transient variation signal TVS. The buffer circuit 2363 for example stores the present peak voltage for one period of the input voltage Vin, and provides the stored peak voltage as the earlier peak voltage to the comparison circuit 2365. The comparison circuit 2365 compares the present peak voltage of the input voltage Vin at the present period with the earlier peak voltage of the last or (an earlier) period, to generate the transient variation signal TVS. That is, the comparison circuit 2365 compares peak voltages of the input voltage Vin from period to period. When a comparison result indicates that a voltage difference of the input voltage Vin, i.e., the transient voltage Vint, from period to period, exceeds the transient voltage upper limit, the transient variation signal TVS triggers the gain control circuit 2063 to switch the gain adjustment switch GSW, whereby the frequency response gain changes from the stable state frequency response gain to the transient state frequency response gain, such that the output current Iout does not exceed the current upper limit Iupl, and/or that the transient response time Ttr of the output current Iout does not exceed the threshold transient time period, so as to prevent the switching regulator 200 from being shut down, to prevent the output current Iout from being unstable, and/or to avoid flicker of a light emitting device circuit which operates according to the output current Iout.

Figure 9:
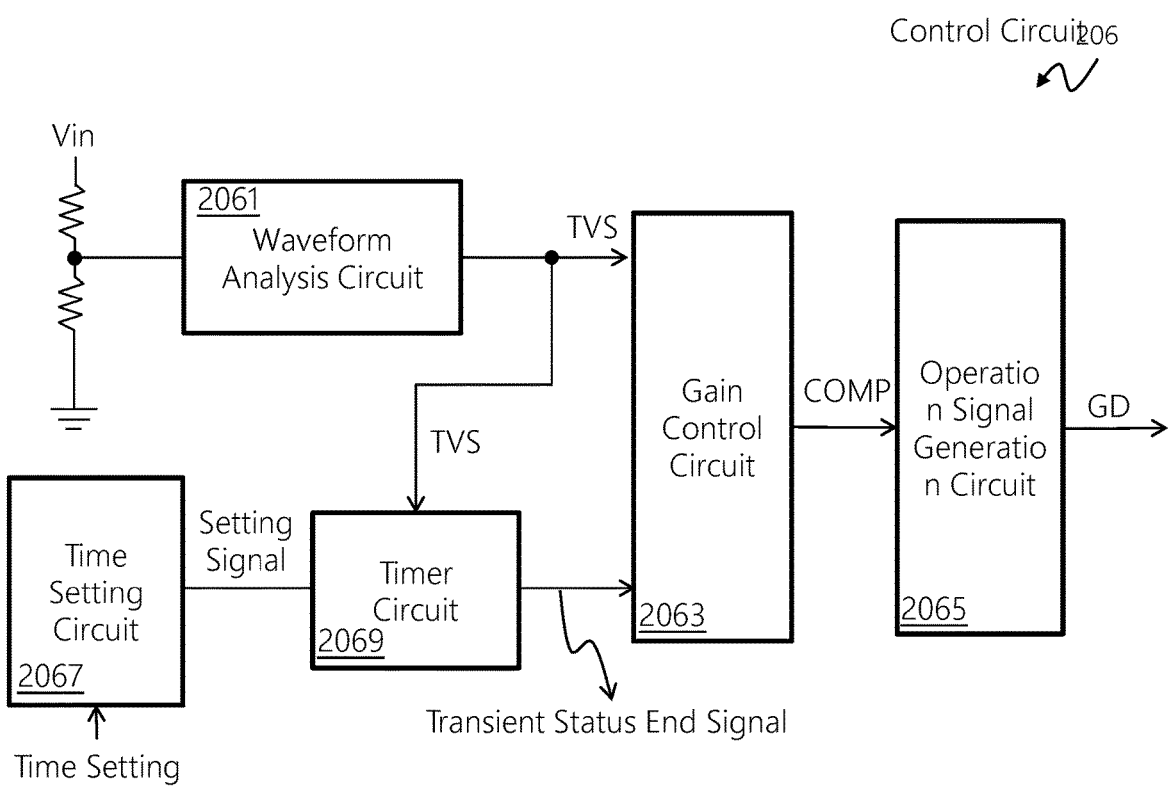
FIG. 9 shows another embodiment of the control circuit 206 according to the present invention.

FIG. 9 shows an embodiment of the control circuit 206 according to the present invention. As shown in the figure, the control circuit 206 includes: the waveform analysis circuit 2061, the gain control circuit 2063, the operation signal generation circuit 2065, a time setting circuit 2067, and a timer circuit 2069. This embodiment is different from the embodiments shown in FIGS. 5 and 6 in that, in this embodiment, the control circuit 206 further includes the time setting circuit 2067 and the timer circuit 2069. The time setting circuit 2067 is configured to operably generate a setting signal according to a time setting. The time setting may be set externally or predetermined internally. The timer circuit 2069 is coupled to the time setting circuit 2067 and the waveform analysis circuit 2061, and is configured to operably generate a transient status end signal according to the setting signal and the transient variation signal TVS, wherein the transient status end signal is inputted to the gain control circuit 2063. The gain switching circuit 2163 (referring to FIGS. 5 and 6) switches the gain adjustment switch GSW further according to the transient status end signal, to determine whether the frequency response gain is the stable state frequency response gain or the transient state frequency response gain, so as to generate the compensation signal COMP. For example, when the transient variation signal TVS, generated by the waveform analysis circuit 2061, indicates that the transient voltage Vint of the input voltage Vin exceeds the transient voltage upper limit, or that the transient slew rate of the input voltage Vin exceeds the transient slew rate upper limit, the transient variation signal TVS changes and turns ON (embodiment of FIG. 5) or OFF (embodiment of FIG. 6) the gain adjustment switch GSW (to add a zero). The timer circuit 2069 counts a predetermined time period according to the setting signal, from the beginning when the transient variation signal TVS indicates that the transient voltage Vint of the input voltage Vin exceeds the transient voltage upper limit, or the beginning when the transient slew rate of the input voltage Vin exceeds the transient slew rate upper limit; as the time period is reached, the timer circuit 2069 generates and sends the transient status end signal to the gain control circuit 2063, so that after the gain adjustment switch GSW is turned ON (embodiment of FIG. 5) or OFF (embodiment of FIG. 6) for the predetermined time period, the gain adjustment switch GSW is turned OFF (embodiment of FIG. 5) or ON (embodiment of FIG. 6) at the end of the predetermined time period, whereby the switching regulator 200 returns to the stable normal operation.

Figure 10:
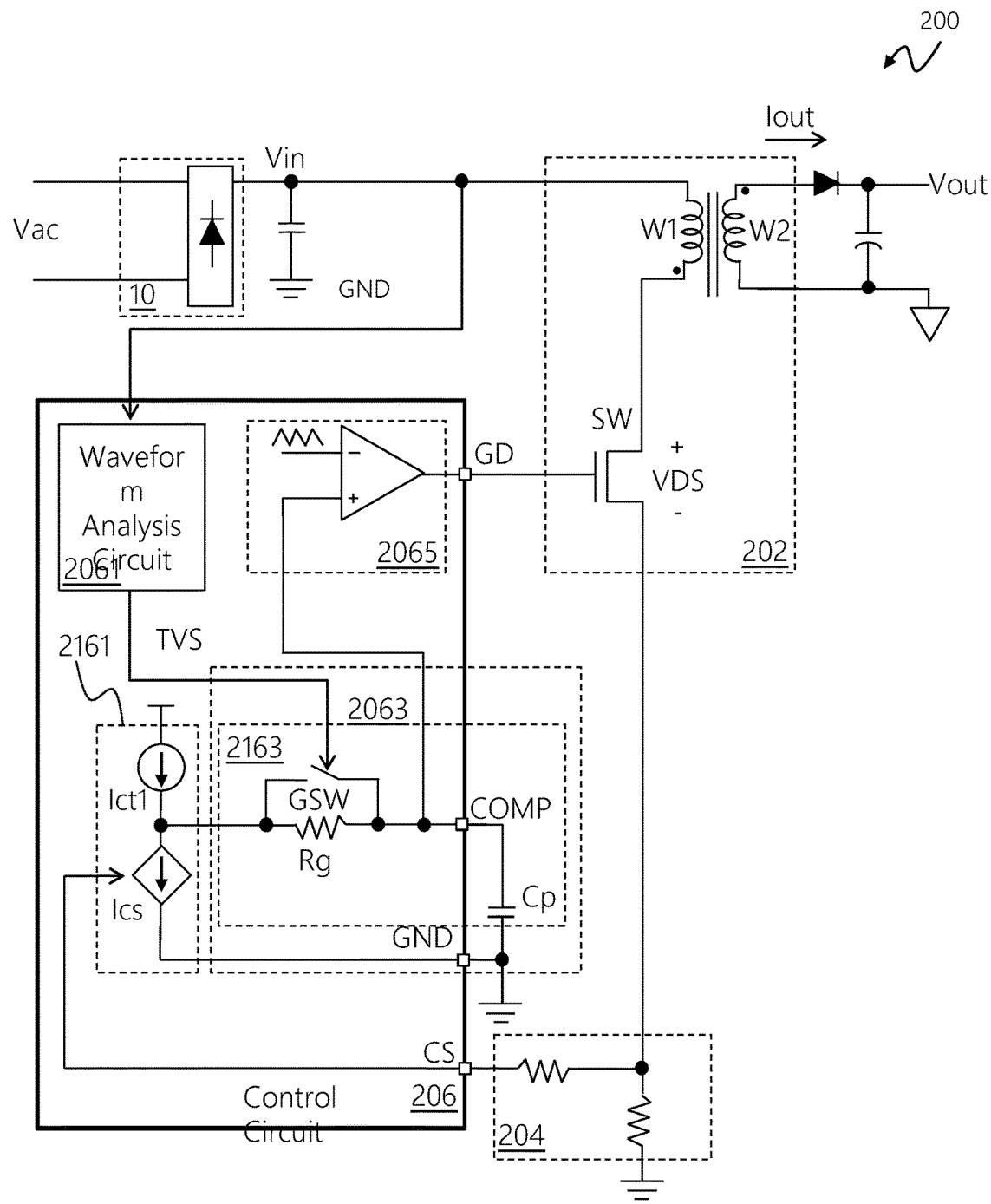
FIG. 10 shows a more specific embodiment of the switching regulator 200 according to the present invention.

FIG. 10 shows a more specific embodiment of the switching regulator 200 according to the present invention. As shown in the figure, the control circuit 206. As shown in the figure, the control circuit 206 includes: the waveform analysis circuit 2061, the gain control circuit 2063, and the operation signal generation circuit 2065. The gain control circuit 2063 includes a controlled current source circuit 2161 and a gain switching circuit 2163. The controlled current source circuit 2161 is configured to operably generate a controlled current according to the current sense signal CS. The gain switching circuit 2163 is coupled to the waveform analysis circuit 2061 and the controlled current source circuit 2161, and is configured to operably control the gain adjustment switch GSW according to the transient variation signal TVS, to determine whether the frequency response gain is the stable state frequency response gain or the transient state frequency response gain, so as to generate the compensation signal COMP.

As shown in the figure, the gain switching circuit 2163 for example includes the gain capacitor Cp, the gain adjustment switch GSW, and the gain resistor Rg, wherein the gain adjustment switch GSW and the gain resistor Rg are connected in parallel. In the gain switching circuit 2163, the gain capacitor Cp for example provides a main pole. In stable normal operation, the transient variation signal TVS keeps the gain adjustment switch GSW ON, and therefore, the main pole of the frequency response gain of the switching regulator 200 is determined by the gain capacitor Cp. When the transient variation signal TVS, generated by the waveform analysis circuit 2061, indicates that the transient voltage Vint of the input voltage Vin exceeds the transient voltage upper limit, or that the transient slew rate of the input voltage Vin exceeds the transient slew rate upper limit, the transient variation signal TVS turns OFF the gain adjustment switch GSW. Thus, the frequency response gain of the switching regulator 200 is adjusted by the gain resistor Rg, which is connected to the gain capacitor Cp in series. This is equivalent to adding a zero to the frequency response gain of the switching regulator 200. Therefore, the frequency response gain is adjusted from the stable state frequency response gain to the transient state frequency response gain, and the unit gain frequency bandwidth is increased temporarily, so that the output current Iout does not exceed the current upper limit, and/or that the transient response time of the output current Iout does not exceed the threshold transient time period. The operation signal generation circuit 2065 for example compares the compensation signal COMP with a ramp signal to generate the operation signal GD.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the resistor or the voltage divider circuit is not limited to a circuit formed by passive devices, but it may be formed by other circuits, such as transistors. For another example, inverted and non-inverted input terminals of the error amplifier circuit and the comparison circuit are interchangeable, with corresponding amendments of the circuits processing these signals. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. For another example, it is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. For example, the waveform analysis circuit 2061 shown in FIG. 8 can be applied to other embodiments shown in FIGS. 2, 4, 5, 6, 9 and 10, etc. In view of the foregoing, the spirit of the present invention should cover all such and other modifications and variations, which should be interpreted to fall within the scope of the following claims and their equivalents.

What is claimed is:

1. A switching regulator with a power factor correction (PFC) function, comprising:
a power stage circuit, configured to operably operate at least one power switch therein according to an operation signal, to convert an input voltage to an output voltage, and to generate an output current;
a current sense circuit, which is coupled to the power stage circuit, and is configured to operably generate a current sense signal according to a switch current flowing through the power switch; and
a control circuit, which is coupled to the power stage circuit and the current sense circuit, and is configured to operably generate the operation signal according to the input voltage and the current sense signal;
wherein when a transient voltage of the input voltage exceeds a transient voltage upper limit, or when a transient slew rate of the input voltage exceeds a transient slew rate upper limit, the control circuit adjusts a frequency response gain from a stable state frequency response gain to a transient state frequency response gain, such that the output current does not exceed a current upper limit, and/or that a transient response time of the output current does not exceed a threshold transient time period;

wherein the control circuit includes:
- a waveform analysis circuit, which is coupled to the power stage circuit, and configured to operably generate a transient variation signal according to the input voltage;
- a gain control circuit, which is coupled to the current sense circuit and the waveform analysis circuit, and configured to operably generate a compensation signal according to the current sense signal and the transient variation signal; and
- an operation signal generation circuit, which is coupled to the gain control circuit and the power stage circuit, and configured to operably generate the operation signal according to the compensation signal.

2. The switching regulator of claim 1, wherein the gain control circuit includes:
- a controlled current source circuit, configured to operably generate a controlled current according to the current sense signal; and
- a gain switching circuit, which is coupled to the waveform analysis circuit and the controlled current source circuit, and is configured to operably control a gain adjustment switch according to the transient variation signal, to determine whether the frequency response gain is the stable state frequency response gain or the transient state frequency response gain, so as to generate the compensation signal.

3. The switching regulator of claim 2, wherein the control circuit further includes:
- a time setting circuit, configured to operably generate a setting signal according to a time setting; and
- a timer circuit, which is coupled to the time setting circuit and the waveform analysis circuit, and is configured to operably generate a transient status end signal according to the setting signal and the transient variation signal, wherein the transient status end signal is inputted to the gain control circuit;
- wherein the gain switching circuit controls the gain adjustment switch further according to the transient status end signal, to determine whether the frequency response gain is the stable state frequency response gain or the transient state frequency response gain, so as to generate the compensation signal.

4. The switching regulator of claim 1, wherein the waveform analysis circuit generates the transient variation signal according to the transient slew rate of the input voltage or a peak-to-peak-to-peak difference of the input voltage.

5. The switching regulator of claim 1, wherein the waveform analysis circuit includes:
- a sample and hold circuit, configured to operably generate a first voltage of an earlier time point according to the input voltage;
- an earlier-later comparison circuit, configured to operably compare the first voltage of the earlier time point with a second voltage of a later time point, to generate a comparison result, wherein the second voltage is related to the input voltage at the later time point; and
- a logic circuit, which is coupled to the earlier-later comparison circuit, and is configured to operably generate the transient variation signal according to the comparison result.

6. The switching regulator of claim 1, wherein the waveform analysis circuit includes:
- a peak hold circuit, configured to operably hold a present peak voltage of the input voltage in a present period;
- a buffer circuit, which is coupled to the peak hold circuit, and is configured to operably store the present peak voltage temporarily as an earlier peak voltage in a next period; and
- a comparison circuit, which is coupled to the peak hold circuit and the buffer circuit, and is configured to operably compare the present peak voltage with the earlier peak voltage, to generate the transient variation signal.

7. A control circuit of a switching regulator with power factor correction (PFC) function, wherein the switching regulator includes a power stage circuit, configured to operably operate at least one power switch therein according to an operation signal, to convert an input voltage to an output voltage, and to generate an output current; a current sense circuit, which is coupled to the power stage circuit, and is configured to operably generate a current sense signal according to a switch current flowing through the power switch; and the control circuit, which is coupled to the power stage circuit and the current sense circuit, and is configured to operably generate the operation signal according to the input voltage and the current sense signal; the control circuit comprising:
- a waveform analysis circuit, which is coupled to the power stage circuit, and configured to operably generate a transient variation signal according to the input voltage;
- a gain control circuit, which is coupled to the current sense circuit and the waveform analysis circuit, and configured to operably generate a compensation signal according to the current sense signal and the transient variation signal; and
- an operation signal generation circuit, which is coupled to the gain control circuit and the power stage circuit, and configured to operably generate the operation signal according to the compensation signal;
- wherein when a transient voltage of the input voltage exceeds a transient voltage upper limit, or when a transient slew rate of the input voltage exceeds a transient slew rate upper limit, the control circuit adjusts a frequency response gain from a stable state frequency response gain to a transient state frequency response gain, such that the output current does not exceed a current upper limit, and/or that a transient response time of the output current does not exceed a threshold transient time period.

8. The control circuit of claim 7, wherein when the transient voltage of the input voltage does not exceed a stable voltage upper limit, or when the transient slew rate of the input voltage does not exceed a stable slew rate upper limit, the control circuit adjusts the frequency response gain from the transient state frequency response gain to the stable state frequency response gain.

9. The control circuit of claim 8, wherein the gain control circuit includes:
- a controlled current source circuit, configured to operably generate a controlled current according to the current sense signal; and a gain switching circuit, which is coupled to the waveform analysis circuit and the controlled current source circuit, and is configured to operably control a gain adjustment switch according to the transient variation signal, to determine whether the frequency response gain is the stable state frequency response gain or the transient state frequency response gain, so as to generate the compensation signal.

10. The control circuit of claim 9, wherein the control circuit further includes:
a time setting circuit, configured to operably generate a setting signal according to a time setting; and
a timer circuit, which is coupled to the time setting circuit and the waveform analysis circuit, and is configured to operably generate a transient status end signal according to the setting signal and the transient variation signal, wherein the transient status end signal is inputted to the gain control circuit;
wherein the gain switching circuit controls the gain adjustment switch further according to the transient status end signal, to determine whether the frequency response gain is the stable state frequency response gain or the transient state frequency response gain, so as to generate the compensation signal.

11. The control circuit of claim 7, wherein after the control circuit counts a predetermined recovery period from a start time point, the control circuit adjusts the frequency response gain from the transient state frequency response gain to the stable state frequency response gain, wherein the start time point is a beginning when the frequency response gain is adjusted from the stable state frequency response gain to the transient state frequency response gain.

12. The control circuit of claim 7, wherein the waveform analysis circuit generates the transient variation signal according to the transient slew rate of the input voltage or a peak-to-peak difference of the input voltage.

13. The control circuit of claim 7, wherein the waveform analysis circuit includes:
a sample and hold circuit, configured to operably generate a first voltage of an earlier time point according to the input voltage;
an earlier-later comparison circuit, configured to operably compare the first voltage of the earlier time point with a second voltage of a later time point, to generate a comparison result, wherein the second voltage is related to the input voltage at the later time point; and
a logic circuit, which is coupled to the earlier-later comparison circuit, and is configured to operably generate the transient variation signal according to the comparison result.

14. The control circuit of claim 7, wherein the waveform analysis circuit includes:
a peak hold circuit, configured to operably hold a present peak voltage of the input voltage in a present period;
a buffer circuit, which is coupled to the peak hold circuit, and is configured to operably store the present peak voltage temporarily as an earlier peak voltage in a next period; and
a comparison circuit, which is coupled to the peak hold circuit and the buffer circuit, and is configured to operably compare the present peak voltage with the earlier peak voltage, to generate the transient variation signal.

15. A control method of a switching regulator with power factor correction (PFC) function, comprising:
operating at least one power switch according to an operation signal, to convert an input voltage to an output voltage, and to generate an output current;
generating a current sense signal according to a switch current flowing through the power switch;
generating the operation signal according to the input voltage and the current sense signal; and
when a transient voltage of the input voltage exceeds a transient voltage upper limit, or when a transient slew rate of the input voltage exceeds a transient slew rate upper limit, adjusting a frequency response gain from a stable state frequency response gain to a transient state frequency response gain, such that the output current does not exceed a current upper limit, and/or that a transient response time of the output current does not exceed a threshold transient time period;
wherein the step of generating the operation signal according to the input voltage and the current sense signal includes:
generating a transient variation signal according to the input voltage;
generating a compensation signal according to the current sense signal and the transient variation signal; and
generating the operation signal according to the compensation signal;
wherein the step of generating a compensation signal according to the current sense signal and the transient variation signal includes:
generating a controlled current according to the current sense signal; and
controlling a gain adjustment switch according to the transient variation signal, to determine whether the frequency response gain is the stable state frequency response gain or the transient state frequency response gain, so as to generate the compensation signal;
wherein the step of controlling a gain adjustment switch according to the transient variation signal, to determine whether the frequency response gain is the stable state frequency response gain or the transient state frequency response gain, so as to generate the compensation signal further includes:
generating a setting signal according to a time setting;
generating a transient status end signal according to the setting signal and the transient variation signal; and
controlling the gain adjustment switch further according to the transient status end signal, to determine whether the frequency response gain is the stable state frequency response gain or the transient state frequency response gain, so as to generate the compensation signal.

16. A control method of a switching regulator with power factor correction (PFC) function, comprising:
operating at least one power switch according to an operation signal, to convert an input voltage to an output voltage, and to generate an output current;
generating a current sense signal according to a switch current flowing through the power switch;
generating the operation signal according to the input voltage and the current sense signal; and
when a transient voltage of the input voltage exceeds a transient voltage upper limit, or when a transient slew rate of the input voltage exceeds a transient slew rate upper limit, adjusting a frequency response gain from a stable state frequency response gain to a transient state frequency response gain, such that the output current does not exceed a current upper limit, and/or that a transient response time of the output current does not exceed a threshold transient time period;

wherein the step of generating the operation signal according to the input voltage and the current sense signal includes:

generating a transient variation signal according to the input voltage;

generating a compensation signal according to the current sense signal and the transient variation signal; and generating the operation signal according to the compensation signal;

wherein the step of generating a transient variation signal according to the input voltage includes:

generating a first voltage of an earlier time point according to the input voltage;

comparing the first voltage of the earlier time point with a second voltage of a later time point, to generate a comparison result, wherein the second voltage is related to the input voltage at the later time point; and generating the transient variation signal according to the comparison result.

17. A control method of a switching regulator with power factor correction (PFC) function, comprising:

operating at least one power switch according to an operation signal, to convert an input voltage to an output voltage, and to generate an output current;

generating a current sense signal according to a switch current flowing through the power switch;

generating the operation signal according to the input voltage and the current sense signal; and when a transient voltage of the input voltage exceeds a transient voltage upper limit, or when a transient slew rate of the input voltage exceeds a transient slew rate upper limit, adjusting a frequency response gain from a stable state frequency response gain to a transient state frequency response gain, such that the output current does not exceed a current upper limit, and/or that a transient response time of the output current does not exceed a threshold transient time period;

wherein the step of generating the operation signal according to the input voltage and the current sense signal includes:

generating a transient variation signal according to the input voltage;

generating a compensation signal according to the current sense signal and the transient variation signal; and generating the operation signal according to the compensation signal;

wherein the step of generating a transient variation signal according to the input voltage includes:

holding a present peak voltage of the input voltage in a present period;

storing the present peak voltage temporarily as an earlier peak voltage in a next period; and comparing the present peak voltage with the earlier peak voltage, to generate the transient variation signal.

* * * * *